United States Patent [19]

Chang

[11] 4,215,320
[45] Jul. 29, 1980

[54] FAR-INFRARED LASER TUNED BY THE DYNAMIC STARK EFFECT

[75] Inventor: Tao-Yuan Chang, Lincroft, N.J.

[73] Assignee: Bell Telephone Laboratories, Incorporated, Murray Hill, N.J.

[21] Appl. No.: 890,263

[22] Filed: Mar. 27, 1978

[51] Int. Cl.² ............................................. H01S 3/22
[52] U.S. Cl. ........................................... 331/94.5 G
[58] Field of Search .................... 331/94.5 G, 94.5 P

[56] References Cited

U.S. PATENT DOCUMENTS 3,892,979   7/1975   Hodgson et al. ................ 331/94.5 G

OTHER PUBLICATIONS

Schabert et al., Dependence on Light Amplitude of the Dynamic Stark Splitting of an Optical Line, Optics Communications, vol. 13, No. 3, (Mar., 1975), pp. 265-267.
Carlston et al., Stimulated Stokes Emission with a Dye Laser: Intense Tuneable Radiation in the Infrared, Optics Communications, vol. 14, No. 1, (May, 1975), pp. 8-12.
Feneuille et al., Conditions for the Observation of the Autler-Townes Effect in a Two Step Resonance Experiment, Le Jrnl. De Physique, vol. 36, (Sep., 1975), pp. 781-786.
Picque et al., Direct Observation of the Autler-Townes Effect in the Optical Range, Jrnl. of Phys. B: Atomic and Mol. Phys., vol. 9, No. 5, (Jan. 1976), pp. L77-L81.
Cotter et al., A High Power, Widely Tunable Infrared Source Based on Stimulated Electronic Raman Scattering in Caesium Vapour, Opt. Com., vol. 16, No. 2, (Feb., 1976), pp. 256-258.
Inguscio et al., Stark Tunability of a CH₃F Far-Infrared Laser, Infrared Physics, vol. 16, (1976), pp. 453-456.
Chang, Optical Pumping in Gases, Topics in Applied Physics, vol. 16: Nonlinear Infrared Generation, Ed. Y. Shen, (Feb. 1977), pp. 215-272.
Tobin et al., Stark Effect on FIR Waveguide Laser Action, IEEE J. Quant. Elect., vol. QE-13, No. 6, (Jun., 1977), pp. 481-484.
Stein et al., High Speed Frequency Modulation of Far-Infrared Lasers Using the Stark Effect, Applied Optics, vol. 16, No. 7, (Jul., 1977), pp. 1893-1896.
Chang, Dynamic Stark Effect in CH₃F and other Optically Pumped Lasers, IEEE, J. Quant. Elect. vol. QE-13, No. 12, (Dec., 1977), pp. 937-942.
Autler et al., Stark Effect in Rapidly Varying Fields, Phys. Rev., vol. 100, No. 2, (Oct., 1955), pp. 703-722.
Bonch-Bruevich et al., Current Methods for the Study of the Stark Effect in Atoms, Usp. Fiz. Nauk 93, (Sov. Phys. Usp., vol. 10), (Sep., 1967 (1968)), pp. 71-110, (637-657).
Bonch-Bruevich et al., Changes in the Atomic Absorption Spectrum in the Field of a Light Wave, I, Sov. Phys., JETP, vol. 29, No. 1, (Jul., 1969), pp. 82-85.
Wynne et al., Optically Pumped Stimulated Emission and Stimulated Electronic Raman Scattering from K Atoms, J. Phys. B: Atom & Mol. Phys. vol. 8, No. 4, (Jan. 1975), pp. L37-L41.

*Primary Examiner*—William L. Sikes
*Attorney, Agent, or Firm*—Daniel D. Dubosky

[57] ABSTRACT

Far-infrared tunable radiation is produced in a four-level laser system by using a pumping means for exciting population from the lowest level of the system to the upper level of a laser transition to create a population inversion between the upper and lower levels of the laser transition and a laser beam which is nearly resonant with the lower level of the laser transition and a fourth level of the system. The laser beam shifts the lower level of the laser transition according to the dynamic Stark effect to provide for tuning of the far-infrared radiation.

7 Claims, 8 Drawing Figures

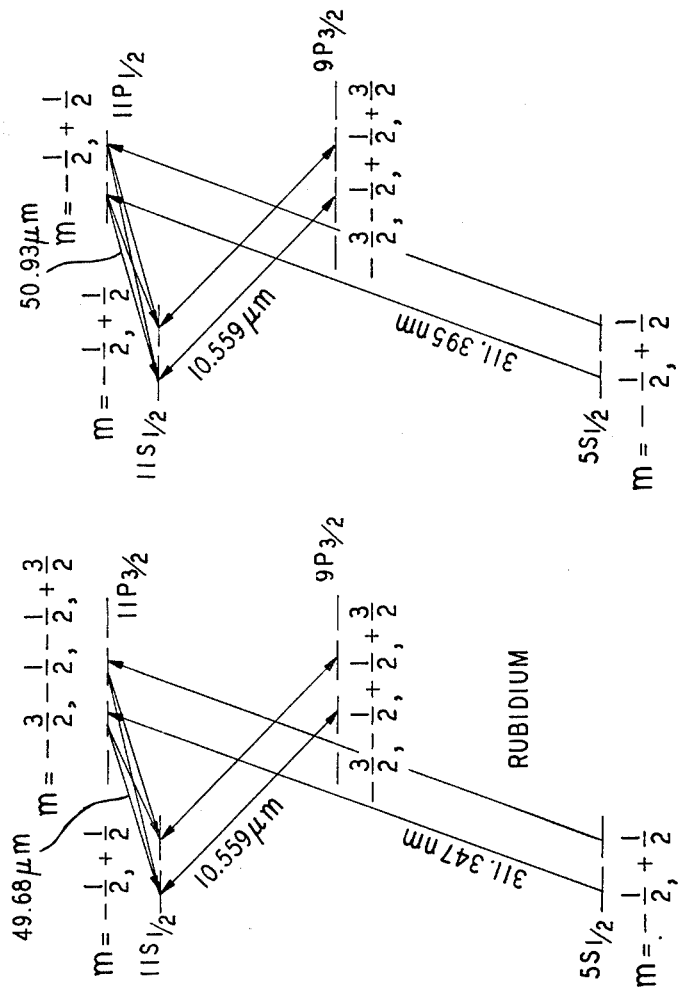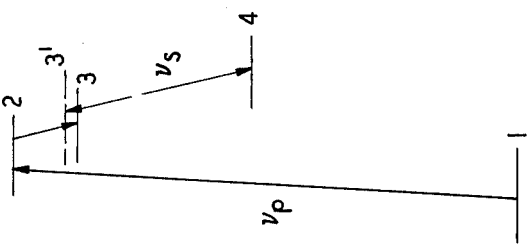

FAR-INFRARED LASER TUNED BY THE DYNAMIC STARK EFFECT

BACKGROUND OF THE INVENTION

The instant invention pertains to the art of producing tunable far-infrared laser radiation.

Although discrete frequency laser lines are now abundantly available throughout the far-infrared spectral region, as is discussed by T. Chang, "Optical Pumping in Gases", pp. 215–272, in *Topics in Applied Physics*, Vol. 16, Nonlinear Infrared Generation, Editor: Y. R. Shen, practical tunable coherent sources are still lacking.

Attempts to produce tunable far-infrared laser radiation using the stimulated-electronic Raman effect, as evidenced in *Optics Communications, February* 1976, pp. 256–258 and *Journal of Physics B: Atomic and Molecular Physics*, 1976, pp. L77–L81, have problems because this type of Raman effect is a resonance phenomenon which requires a tunable pump laser. This causes the usable output radiation to be weaker as the pump laser is tuned further away from the pumping transition. A further problem with the stimulated-electronic Raman effect is that the emission at the "tuned frequency" is usually accompanied by an undesired emission at the single photon transition. This second emission has essentially the same small signal gain as the tunable output.

Attempts to tune molecular far-infrared lasers using DC Stark tuning, as evidenced in *Infrared Physics*, Vol. 16, p. 453, 1976, *IEEE Journal of Quantum Electronics*, Q.E. 13, p. 481, 1977 and *The Applied Optics*, Vol. 16, p. 1893, 1977, suffer from the fact that (a) all levels of the system are affected by the electric field, including the pump transitions, (b) the systems require far-infrared resonators which would have to be tuned in step with the Stark field, (c) the maximum possible Stark shift as limited by gas breakdown is relatively small, and (d) is almost all molecular far-infrared lasers, the laser transition splits into many Stark components.

The prior art contains references to fundamental investigations of the phenomenon known as the dynamic Stark effect. In studying this phenomenon, investigators have used absorption methods to detect the line shift and to verify experimentally that it coincides with theory. These studies have utilized three-level systems where intense radiation was applied between the bottom and middle levels of the system in order to shift the middle level. The shift of the middle level was probed by measuring the absorption of incident radiation whose energy corresponded to transitions between the middle and upper levels of the system. Although these experimental and theoretical investigations form prior art for the dynamic Stark effect they do not teach its use for producing the unique results obtained by the instant invention.

SUMMARY OF THE INVENTION

The invention relates to a tunable far-infrared laser system comprising at least four levels. There is a laser transition existing between two of the levels. A means is provided to excite population from the lowest level of the system to the upper level of the laser transition to create a population inversion between the upper and lower levels of the laser transition. The system is illuminated by radiation, hereinafter referred to as "shifter radiation", whose energy is nearly resonant with the transition between the lower level of the laser transition and the fourth level of the system. The illumination causes the energy of the lower level of the laser transition to shift according to the dynamic Stark effect. It is this shift that causes the tunability of the far-infrared laser output. The instant invention provides several features that solve problems which confront persons skilled in the prior art.

One feature of the invention is that the dynamic Stark effect is a resonance effect between the lower level of the laser transition and the fourth level of the system. This results in shifting only the tunable emission frequency without affecting the pump transition.

Yet another feature is that the tuning of the radiation is dependent on the intensity of the "shifter radiation" and doesn't require a tunable laser.

Yet another feature is that the laser system may comprise metal vapors whose large dipole moments for Rydberg transitions lead to a large tuning range. This will also permit operation of the laser in the superfluorescence mode and thereby eliminate the need for a resonator tuned in step with the Stark field.

Yet another feature is that the tunable laser radiation can be produced without extraneous frequency components by choosing both the lowest level of the system and the lower laser transition level to be $J=\frac{1}{2}$ states or $J=0$ states and exposing the system to plane polarized pump radiation.

Yet another feature is the ability to suppress superfluorescence from two-photon resonances of the system to ensure spectral-purity.

Yet another feature is that the fourth level of the system may be higher or lower in energy than the lower level of the laser transition.

Yet another feature is that the mechanism for populating the upper level of the laser transition is not restricted to optical pumping, but may include as an example, such other methods as a gas discharge excitation.

BRIEF DESCRIPTION OF THE DRAWING

A complete understanding of the present invention may be gained from a consideration of the following detailed description presented hereinbelow in connection with the accompanying drawings in which:

FIG. 2 is a pictorial description of the four-level system;

FIG. 3 is a pictorial description illustrating the four-level system with respect to the embodiment in FIG. 1 using the 49.68 micron line in Rb;

FIG. 4 is a pictorial description illustrating the four-level system with respect to the embodiment in FIG. 1 using the 50.93 micron line in Rb;

DETAILED DESCRIPTION OF THE DRAWING

FIGS. 2, 3 and 4 are representative energy level diagrams illustrating the tuning scheme. The atoms in the metal vapor for this reduction to practice are resonantly excited from level one to level two by optical pumping with a laser of frequency $\nu_p$. In the particular material we have chosen there is an exceptionally large oscillator strength which gives rise to superflourescence (lasing without need of a resonant cavity) at frequency $\nu_{23}$. If a uniform infrared field at frequency $\nu_5$ (the "shifter radiation") which is close to $\nu_{34}$ is also present, the far-infrared (FIR) emission at $\nu_{23}$ will be snifted from $\nu_{23}$ by an amount $\delta\nu$ due to the dynamic Stark effect: where $$\delta\nu = \sqrt{(\Delta\nu/2)^2 + \nu_R^2} - \Delta\nu/2 \qquad (1)$$

and $$\Delta\nu = \nu_s - \nu_{34}° \qquad (2)$$

is the frequency offset between the input infrared field (the "shifter radiation") and the frequency of the transition between levels three and four in the absence of the infrared field, and $$\nu_R = |\mu_{34} E_s|/(2h) \qquad (3)$$

where $\mu_{34}$ is the dipole matrix element between levels three and four, h is Planck's constant and $E_s$ is the electric field intensity of the infrared field. For $\nu_R << \Delta\nu$ Eq. (1) reduces to $\delta\nu = \nu_R^2/\Delta\nu$ which makes $\delta\nu$ linearly dependent on the Stark intensity $I_s = (cE_s^2/8\pi)$. As the Stark intensity is increased, the gain at $\nu_{23}' = \nu_{23}° - \Delta\nu - \delta\nu$ due to the 2-3'-4 two-photon transition, increases at the expense of the gain at $\nu_{23}$. To avoid superflourescence at $\nu_{23}$, which would distort the spectral purity of the FIR emission, $\nu_R/\Delta\nu$ must be kept below a certain value in practice.

Figure 1:
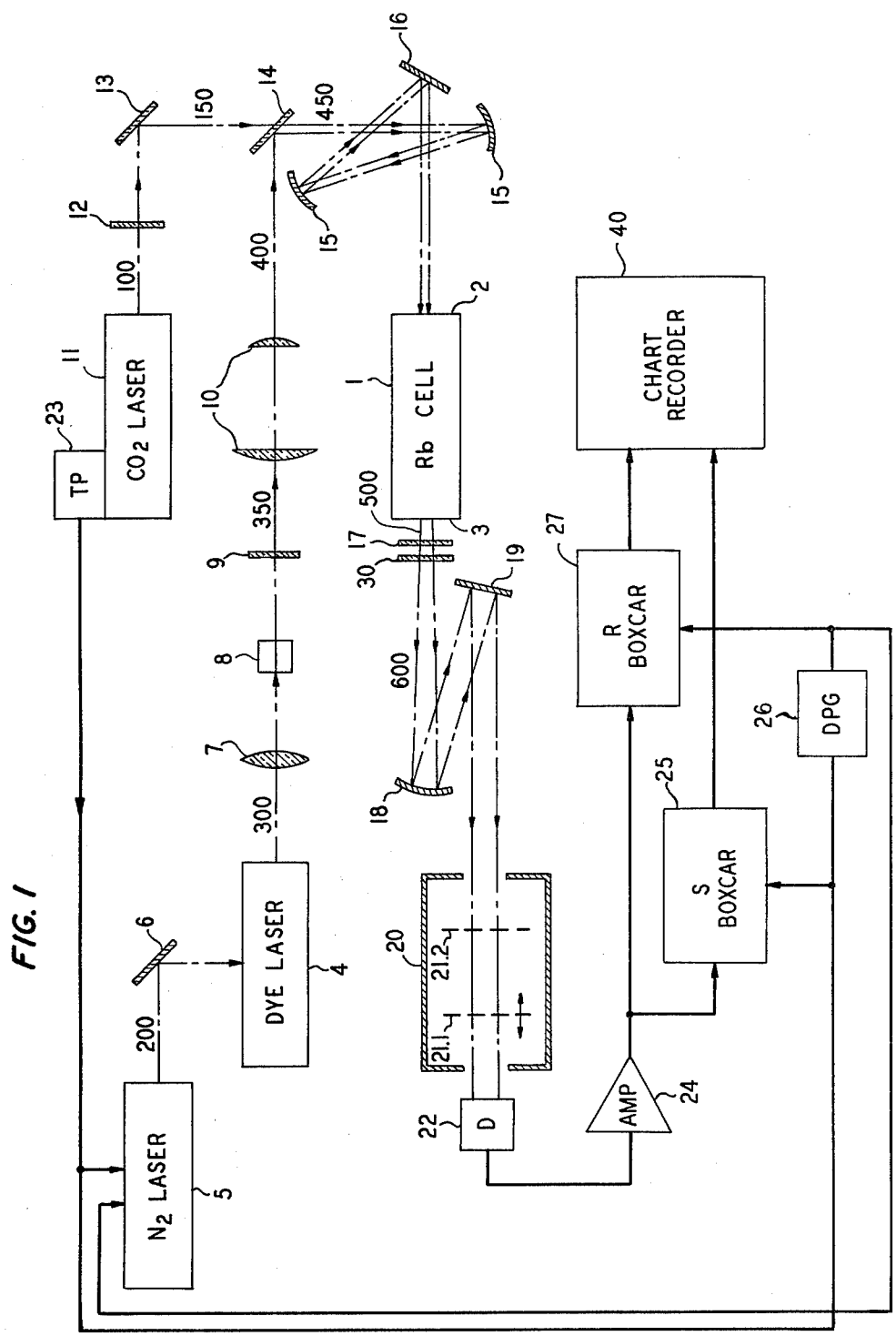
FIG. 1 shows in partially pictorial, partially schematic form an embodiment of the present invention.

In FIG. 1, a 50 cm long heat pipe oven vapor cell 1 having a $BaF_2$ input window 2 and a polyethylene output window 3 is loaded with Rb metal and operated at 300° C. with 20 Torr He pressure to generate a vapor column about 25 cm long with a vapor pressure of approximately 1 Torr.

A UV pump beam 400 at a wavelength of approximately 311 nm ($\nu_p$ in FIG. 2) is obtained as follows: A Rhodamine-B dye laser 4 is pumped by a beam 200, which in turn is generated by a nitrogen laser 5. The output beam 300 of the Rhodamine-B dye laser 4 at 622 nm is focused by a lens 7 onto an ADP crystal 8 in order to double the frequency. Filter 9 only passes wavelength components from beam 300 which are near 311 nm in order to produce a beam 350. Beam 350 in turn is reshaped by a cylindrical telescope 10 to form pump beam 400.

An infrared beam 150 ($\nu_s$ in FIG. 2) is generated from a three meter long, grating tuned $CO_2$ laser 11, which is Q-switched at 120 pps by a rotating mirror (in the laser cavity but not shown). The output beam 100 at wavelength 10.6 $\mu$m is passed through an attenuator 12 and deflected by a reflector 13 to form beam 150. The two beams 150 and 400 are combined by means of a dichroic beam splitter 14 to form combined beam 450. The combined beam 450 is then weakly focused by spherical telescope 15 and sent into cell 1 by a beam reflector 16.

The nitrogen laser 5 is synchronously triggered every 25th $CO_2$ pulse by using trigger pickoff 23. The nitrogen laser 5 is also pumped midway between the synchronous pulses of the $CO_2$ laser 11 by being triggered from a delay pulse generator 26. These pulses occur at a time when no $CO_2$ pulse is present in order to provide a reference signal. The temporal width of the $CO_2$ laser pulse in beam 150 is 280 ns, while that of the UV pulse in beam 400 is approximately ~3ns. In the vapor cell 1, the cross section of the UV beam 400 is about 0.038 $cm^2$ with a peak power of about 30W, while the cross section of the $CO_2$ laser beam 150 is 0.3 $cm^2$ with a peak power of 1.5 kW.

The output beam 500 from cell 1 passes through a filter 17 which is a Kel-F (Poly-$C_2F_3Cl$) filter to block the 10 $\mu$m signal. The FIR output beam 600 out of filter 17 is detected by a GE:Ga detector 22 after being collimated by a mirror 18, reflected by mirror 19, and coupled through a scanning Fabry-Perot interferometer 20.

The reduction to practice was demonstrated by measuring the FIR wavelength and frequency shift. This was done through use of the 25 cm long dry-nitrogen purged scanning Fabry-Perot interferometer 20 in front of the detector 22, which interferometer is equiped with metal-meshed mirrors 21.1 and 21.2 of 25 $\mu$m mesh constant. For the measurement of frequency shift, two commerically available boxcar integrators 25 and 27 are used to process the signal detected behind Fabry-Perot 20 by detector 22. One boxcar 25 selects the 50 $\mu$m pulses that are synchronous with the $CO_2$ laser pulses by obtaining the output of trigger pickup 23 and the output of detector 22 after it has been amplified by amplifier 24. The second boxcar 27 obtains the reference 50 $\mu$m pulses occuring between $CO_2$ pulses by receiving the output of the detector 22 after it has been amplified by 24. This second boxcar 27 is timed by delay pulse generator 26.

The UV source, beam 400, can be tuned to pump either the $5S_{\frac{1}{2}} \rightarrow 11P_{3/2}$ or the $5S_{\frac{1}{2}} \rightarrow 11P_{\frac{1}{2}}$ transitions of Rb. The output FIR wavelengths determined from Fabry-Perot scans were 49.6±0.2 $\mu$m and 50.8±0.2 $\mu$m respectively, in agreement with known spectroscopic data for 11P→11S transitions (49.68 and 50.93 $\mu$m). The pump field 400 is linearly polarized and the 49.7 $\mu$m output 500 is strongly polarized in the same direction as the pump field, while the 50.9 $\mu$m output is unpolarized. These observations can be explained with the help of the detailed energy level diagrams shown in FIGS. 3 and 4. The linearly polarized pump beam populates only the m=±½ sublevels of the 11P states via the $\Delta m = 0$ transitions. Thus, the m=±3/2 sublevels of the $11P_{3/2}$ state remain unpopulated. Consequently, for the 49.7 $\mu$m transition in FIG. 3, two stronger components of the four $\Delta m = \pm 1$ transitions are missing and as a result, causes the dominance of polarization which is parallel to the input beam. For the 50.9 $\mu$m transition if FIG. 4, all components are equally excited by the linearly polarized pump, hence, there is no preferred output polarization.

For the embodiment described using Rb, the 50 $\mu$m outputs showed an exponential dependence on the pump power with a computed threshold of 14 W. A second superflourescent signal at ~34 $\mu$m corresponding to the 11P→9D transition appears for the UV pump power in excess of 28 W. This unwanted signal is minimized by limiting the UV pump power and is blocked from detector 22 by using a LiF Yoshinaga filter 30.

We note that using the 11S1/2 state as the common terminal level for both the 49.7 $\mu$m and 50.9 $\mu$m lines and a linearly polarized infrared Stark field causes the 11S1/2 state to be shifted as a whole unit without any sublevel splitting because only $\Delta m = 0$ transitions are excited and the $\frac{1}{2} \rightarrow \frac{1}{2}$ and $-\frac{1}{2} \rightarrow -\frac{1}{2}$ transitions are of the same strength. This shift should be independent of the infrared field polarization or choice of quantization axis. Thus, using linearly polarized UV laser beams to pump from a $J=\frac{1}{2}$ initial state results in a population at $m=\pm\frac{1}{2}$ states and using a $J=\frac{1}{2}$ state as the lower laser level suppresses splitting of this state in the presence of the Stark field. These conditions combine to produce an output which consists of a single frequency and which is independent of the angle between the UV pump field and the $CO_2$ laser field.

Figure 5:
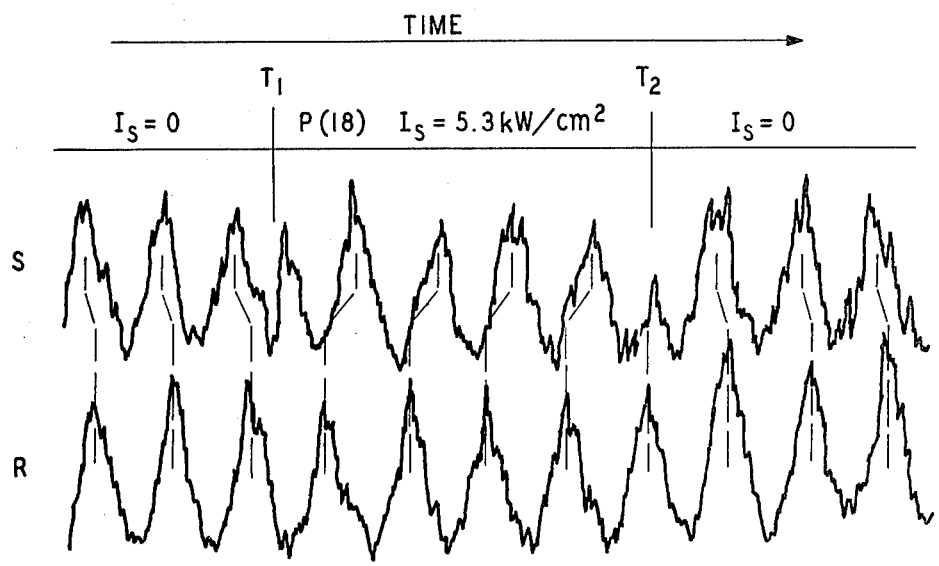
FIG. 5 is a chart reproduction of the simultaneously recorded Fabry-Perot scans from the embodiment of FIG. 1.

FIG. 5 is an example of chart recorded 40 in FIG. 1 of the reference signal from boxcar 27 and of the synchronous signal from boxcar 25.

Figure 6:
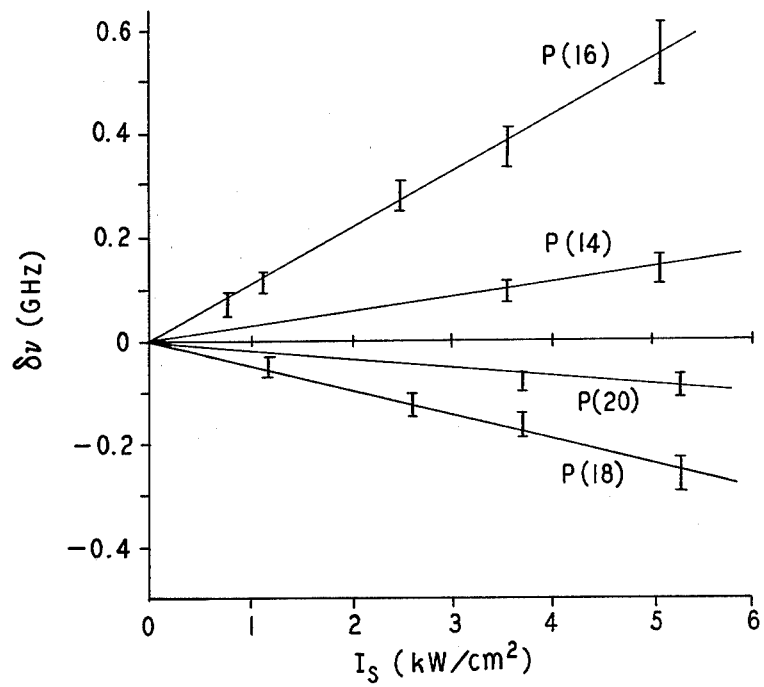
FIG. 6 is a graph of the tuning obtained using the embodiment of FIG. 1.

When the Stark intensity $I_s$ is 0 prior to $T_1$ and after $T_2$ in FIG. 5, the two sets of fringes are separated by the distance between two recorder pens. When a $CO_2$ laser beam of a certain intensity is applied to the metal vapor (between times $T_1$ and $T_2$ in FIG. 5) the fringes in the S trace taken from boxcar 25 shows a shift from those of the R trace taken from boxcar 27. From this shift and the free spectral range of the Fabry-Perot, the amount of frequency tuning produced by the $CO_2$ laser beam is determined. The results for four different $CO_2$ laser lines at several $CO_2$ laser intensities are shown for the 49.7 μm line in FIG. 6.

Since the frequency of the P(16)$CO_2$ laser line is somewhat higher than that of the $11S_{\frac{1}{2}} \rightarrow 9P_{3/2}$ transitions in rubidium, the P16 laser field should cause the $11S_{\frac{1}{2}}$ state to shift downward and the frequency of the 49.7 μm output to shift up. The P(18) line causes the FIR frequency to shift down by a smaller amount. From these P(16) and P(18) data, the tuning slopes for P(14) and P(20) are calculated and drawn on FIG. 6. Measurements on the 50.9 μm line give substantially the same results.

By using a TEA $CO_2$ laser it should be possible to obtain a reasonably uniform infrared field three orders of magnitude more intense than in the present case. For the P(16) line, the condition $\nu_R << \Delta\nu$ will be violated. However, by increasing $\Delta\nu$ to $\sim 10$ cm$^{-1}$, the above condition can be satisfied again and a tuning range of $\sim \pm 1$ cm$^{-1}$ can be obtained.

Tunable radiation in other parts of the far-infrared spectrum can be generated by applying the same scheme to other transitions in metal vapors and by using other transitions in metal vapors and by using other infrared lasers.

Figure 7:
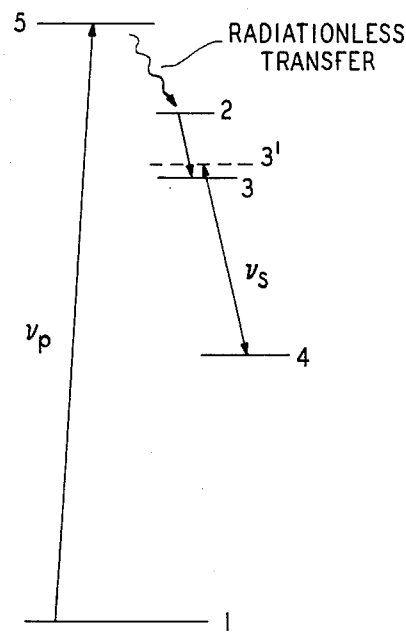
FIG. 7 is a pictorial description of an embodiment with five levels.
Figure 8:
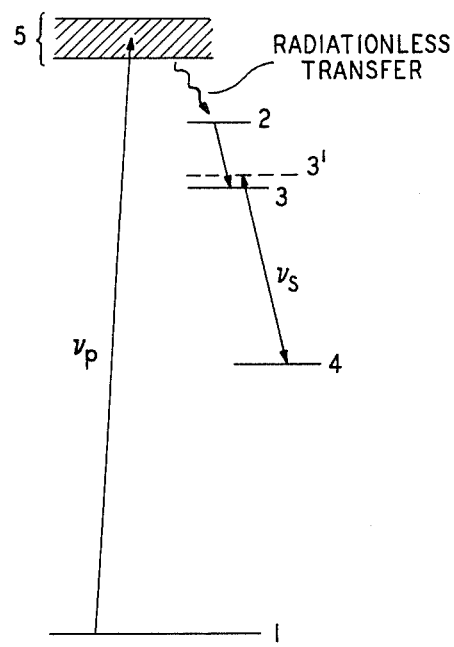
FIG. 8 is a pictorial description of an embodiment with an upper band of levels.

A further embodiment of the invention may be created by using materials having upper levels whose energies are higher than that of the upper laser transition level. Excitation to these upper levels may be accomplished by such methods as pumping by radiation or electric discharge. The population induced in these upper levels may now decay to the upper laser transition by a variety of methods, among which are by radiationless collisions. This is illustrated (a) in FIG. 7 where atoms are excited from level 1 to level 2 by optical pumping with a laser of frequency $\nu_p$. The atom then experiences a radiationless transition to the upper laser transition level 2 and (b) in FIG. 8 where atoms are excited from level 1 to states in absorption band 5. The atom then experiences a radiationless transition to the upper laser transition level 2.

What is claimed is:

1. A tunable far-infrared laser comprising:
    a material having at least one lowest energy level and three other levels, and further having a laser transition existing between an upper transition level and a lower transition level from said three other levels;
    pump means for creating a population inversion between said upper transition level and said lower transition level of said laser transition;
    characterized in that said laser further includes means for illuminating said material by radiation whose energy is near the energy difference between said lower transition level and the other one of said three other levels; and
    means for varying the intensity of said radiation.

2. A far-infrared laser as defined in claim 1 in which the means for populating said upper transition level of said laser transition is a laser.

3. A tunable far-infrared laser as defined in claim 2 in which the material is a metal vapor.

4. A tunable far-infrared laser as in claim 3 in which the metal vapor is rubidium.

5. A tunable far-infrared laser as in claim 4 in wich said lowest energy level has $J=\frac{1}{2}$.

6. A tunable far-infrared laser as in claim 5 in which the lower transition level has $J=\frac{1}{2}$.

7. A tunable far-infrared laser as defined in claim 6 which further includes means for plane polarizing the radiation from said laser which populates said upper transition level of said laser transition.

* * * * *

UNITED STATES PATENT AND TRADEMARK OFFICE
CERTIFICATE OF CORRECTION

PATENT NO. : 4,215,320

DATED : July 29, 1980

INVENTOR(S) : Tao-Yuan Chang

It is certified that error appears in the above—identified patent and that said Letters Patent is hereby corrected as shown below:

Column 1, line 38, "(d) is" should read --(d) in--.
Column 4, line 10, "GE:Ga" should read --Ge:Ga--;
          line 50, "if" should read --in--.
Column 5, lines 10 and 11 should read --FIG. 5 is an example of simultaneously recorded Fabry-Perot scans obtained on chart recorder 40 in FIG. 1, etc.--.
Column 6, line 39, "wich" should read --which--.

Signed and Sealed this

Thirty-first Day of March 1981

[SEAL]

Attest:

RENE D. TEGTMEYER

Attesting Officer     Acting Commissioner of Patents and Trademarks